(12) United States Patent
Ennis (10) Patent No.: US 8,850,826 B2
(45) Date of Patent: Oct. 7, 2014

(54) CARBON CAPTURE WITH POWER GENERATION

(75) Inventor: Bernard P. Ennis, Cedar Grove, NJ (US)

(73) Assignee: EGT Enterprises, Inc., Cedar Grove, NJ (US)

( * ) Notice: Subject to any disclaimer, the term of this patent is extended or adjusted under 35 U.S.C. 154(b) by 903 days.

(21) Appl. No.: 12/951,541

(22) Filed: Nov. 22, 2010

(65) Prior Publication Data

US 2011/0120137 A1    May 26, 2011

Related U.S. Application Data

(60) Provisional application No. 61/263,140, filed on Nov. 20, 2009.

(51) Int. Cl.
*F02C 6/14*    (2006.01)
*H01M 8/06*    (2006.01)
*H01M 8/22*    (2006.01)
*H01M 8/04*    (2006.01)
*F02C 7/224*   (2006.01)

(52) U.S. Cl.
CPC ............ *H01M 8/0643* (2013.01); *F02C 7/224* (2013.01); *Y02E 60/50* (2013.01); *H01M 8/225* (2013.01); *H01M 8/04082* (2013.01); *Y02E 20/16* (2013.01)
USPC ............. 60/780; 60/39.465; 60/784; 429/416

(58) Field of Classification Search
CPC ........... F02C 7/24; Y02E 60/50; Y02E 20/16; H01M 8/225; H01M 8/04082; H01M 8/0643
USPC .............. 60/39.465, 780, 783, 784; 429/416, 429/502, 503, 505
See application file for complete search history.

(56) References Cited

U.S. PATENT DOCUMENTS

| | | | |
|---|---|---|---|
| 1,220,391 A | 3/1917 | Bacon et al. | |
| 1,528,324 A | 3/1925 | Fischer | |
| 1,536,612 A | 5/1925 | Lewis | |
| 1,596,070 A | 8/1926 | Snelling | |
| 1,813,514 A | 7/1931 | Schmidt et al. | |
| 2,910,411 A * | 10/1959 | Offutt | 423/450 |
| 2,982,622 A | 5/1961 | Jahnig et al. | |
| 3,118,042 A | 1/1964 | Parker | |
| 3,156,734 A | 11/1964 | Happel | |
| 3,227,771 A | 1/1966 | Happel et al. | |
| 3,254,957 A | 6/1966 | Meiers et al. | |

(Continued)

OTHER PUBLICATIONS

Rastler, D. and Chen, TP., "Systems Assessment of Direct Carbon Fuel Cells", 2008 Fuel Cell Seminar, Phoenix, AZ, Oct. 28, 2008, pp. 1-25.*

(Continued)

*Primary Examiner* — William H Rodriguez
*Assistant Examiner* — Lorne Meade
(74) *Attorney, Agent, or Firm* — Schnader Harrison Segal & Lewis LLP (57) ABSTRACT

A gas turbine power generation system having a carbon production apparatus and a carbon fuel cell to generate electricity. The carbon production apparatus is functionally connected to the fuel cell to provide carbon to the fuel cell to generate electricity. The system is configured to power the carbon production apparatus with a portion of the electricity generated from the fuel cell.

27 Claims, 6 Drawing Sheets

(56) References Cited

U.S. PATENT DOCUMENTS

| | | | |
|---|---|---|---|
| 3,377,204 A | 4/1968 | Mather et al. | |
| 3,514,264 A | 5/1970 | Sennewald et al. | |
| 3,793,438 A | 2/1974 | Gunnel et al. | |
| 3,978,663 A | 9/1976 | Mandrin et al. | |
| 4,282,010 A * | 8/1981 | Cherish et al. | 48/77 |
| 4,410,504 A | 10/1983 | Galasso et al. | |
| 4,836,898 A | 6/1989 | Noyes | |
| 4,851,152 A * | 7/1989 | Najjar | 252/373 |
| 4,854,937 A | 8/1989 | Meyer et al. | |
| 5,100,638 A | 3/1992 | Levin | |
| 5,198,084 A | 3/1993 | Cha et al. | |
| 5,852,927 A | 12/1998 | Cohn et al. | |
| 6,021,402 A | 2/2000 | Takriti | |
| 6,213,234 B1 * | 4/2001 | Rosen et al. | 180/65.245 |
| 6,221,507 B1 | 4/2001 | Gewelber | |
| 6,868,677 B2 * | 3/2005 | Viteri et al. | 60/784 |
| 7,097,675 B2 | 8/2006 | Detering et al. | |
| 7,563,525 B2 | 7/2009 | Ennis | |
| 7,862,938 B2 * | 1/2011 | Ghezel-Ayagh | 429/425 |
| 7,910,258 B2 * | 3/2011 | Steinberg | 429/472 |
| 2004/0006915 A1 | 1/2004 | Renn | |
| 2004/0166055 A1 | 8/2004 | Stickney et al. | |
| 2004/0221507 A1 | 11/2004 | Wu et al. | |
| 2004/0265223 A1 | 12/2004 | Etievant et al. | |
| 2004/0265651 A1 | 12/2004 | Steinberg | |
| 2005/0072152 A1 | 4/2005 | Suzuki et al. | |
| 2006/0220388 A1 | 10/2006 | Teets et al. | |
| 2007/0186470 A1 | 8/2007 | Ennis | |
| 2007/0269688 A1 | 11/2007 | Lipilin et al. | |
| 2008/0124613 A1 | 5/2008 | Gur et al. | |
| 2008/0155984 A1 | 7/2008 | Liu et al. | |
| 2008/0187789 A1 * | 8/2008 | Ghezel-Ayagh | 429/13 |
| 2009/0136797 A1 | 5/2009 | Ong et al. | |
| 2009/0155645 A1 | 6/2009 | Cui et al. | |
| 2009/0205337 A1 | 8/2009 | Oser et al. | |
| 2010/0038082 A1 | 2/2010 | Zubrin et al. | |
| 2010/0077752 A1 | 4/2010 | Papile | |
| 2010/0077767 A1 | 4/2010 | Balmas et al. | |
| 2010/0193742 A1 | 8/2010 | Oettinger | |

OTHER PUBLICATIONS

Steinberg, M.S., "An Innovative Highly Efficient Combined Cycle Fossil and Biomass Fuel Power Generation and Hydrogen Production Plant with Zero CO2 Emission", 2nd Int'l Conf on Carbon Sequestration, US DOE, Alexandria, VA, May 6-8, and paper of Mar. 2003. pp. 1-18.*

International Search Report and Written Opinion for PCT/US2010/057602 dated Jan. 21, 2011.

International Search Report and Written Opinion dated Jul. 1, 2008 for PCT Patent Application PCT/US2007/062109.

Information Disclosure Statement dated Apr. 23, 2007 for U.S. Appl. No. 11/674,250.

Office Action dated Jun. 10, 2008 for U.S. Appl. No. 11/674,250.

Amendment and Response to Jun. 10, 2008 Office Action for U.S. Appl. No. 11/674,250.

Office Action dated Oct. 10, 2008 for U.S. Appl. No. 11/674,250.

Amendment and Response to Oct. 10, 2008 Office Action for U.S. Appl. No. 11/674,250.

Advisory Action dated Nov. 20, 2008 for U.S. Appl. No. 11/674,250.

Office Action dated Feb. 20, 2009 for U.S. Appl. No. 11/674,250.

Applicant's Telephone Interview Summary dated Mar. 3, 2009 for U.S. Appl. No. 11/674,250.

Notice of Allowability dated Mar. 30, 2009 for U.S. Appl. No. 11/674,250.

Williams, et al., An Application of Solid Particles in Fuel Cell Technology, University of Utah, KONA No. 25 (2007).

* cited by examiner

CARBON CAPTURE WITH POWER GENERATION

BACKGROUND

The most commonly adopted approach to producing power from natural gas is by the use of combined-cycle gas turbines. Although the technology has proven to be viable, large amounts of carbon dioxide ("$CO_2$") are continuously exhausted into the atmosphere as a result of the combustion process. Accordingly, there is a need for a system that reduces release of $CO_2$ into the atmosphere.

SUMMARY OF THE INVENTION

Illustrative embodiments of the invention, provide a power generation system having a carbon production apparatus and a carbon fuel cell to generate electricity. The carbon production apparatus is functionally connected to the fuel cell to provide carbon to the fuel cell to generate electricity. The system is configured so a portion of the electricity generated from the fuel cell may be used to power the carbon production apparatus. The carbon production apparatus may be an Electric Reaction Technology ("ERT") system having electric resistance heater and one or more heating zones, wherein each heating zone comprises one or more heating stations and each heating station comprises one or more heating screens followed by a final near-equilibrium attainment zone without additional heat input. The ERT system decomposes hydrocarbons gas into hydrogen and carbon solids. A gas turbine system may be incorporated and configured so the hydrogen gas from the carbon production apparatus is input as fuel to the gas turbine system's combustor. Illustrative embodiments of an ERT include EGT Enterprise, Inc.'s (EGT'S) ERT systems described in U.S. Pat. No. 7,563,525.

The power generation system may be configured so oxygen-depleted air released from the fuel cell enters a combustor of the gas turbine system and serves as a diluant/coolant, thereby reducing the load on the compressor.

The invention includes a method for generating electricity and a method for reconfiguring a gas turbine system to incorporate a fuel cell.

DESCRIPTION OF THE DRAWINGS

The invention is best understood from the following detailed description when read in conjunction with the accompanying drawings.

DESCRIPTION OF THE INVENTION

Illustrative embodiments of the invention will transform the combined-cycle gas turbine power generation by potentially achieving over 90% $CO_2$ capture while increasing the amount of power generation per unit of natural gas feed by potentially 15-30%.

In an exemplary embodiment of the invention, the process merges two technologies:

The ERT system, such as described for example in U.S. Pat. No. 7,563,525 (incorporated herein by reference), that decomposes methane or other hydrocarbons to produce hydrogen and carbon; and The Direct Carbon Fuel Cell that produces electricity and simultaneously converts the carbon to pure or near pure saleable $CO_2$, thereby capturing and reducing emissions.

Illustrative embodiments of the invention provide a transformational technology to capture $CO_2$ from a conventional combined-cycle gas turbine while increasing the power generation of the system. There are three important process units in exemplary embodiments of the invention:

1. Electric Reaction Technology ("ERT") system
2. Direct Carbon Fuel Cell ("DCFC")
3. Combined-Cycle Gas Turbine ("GTCC")

The GTCC operates quite similarly to a conventional gas turbine except instead of combusting natural gas, it will use hydrogen with small amounts of residual methane as a fuel. Utilizing hydrogen as the fuel source produces water through the combustion process instead of $CO_2$, a greenhouse gas. The hydrogen is produced in the ERT system by decomposing methane, which also generates carbon solids. The carbon solids are reacted with air in the DCFC to produce electricity, potentially at ultra-high efficiency, and substantially pure $CO_2$ (a saleable product).

Exemplary examples of an ERT system, a direct carbon fuel cell, and a combined-cycle gas turbine will now be described.

Electric Reaction Technology

Illustrative embodiments of the invention feature a single ERT unit at its core as well as a hydrogen-carbon separation unit. In this section an illustrative ERT unit or system will be described. The ERT unit is a gas phase, single pass, plug flow, chemical reactor, with multiple electric-resistance heaters inside its reaction chamber. This configuration is based upon the concept of minimizing reaction time, and consequently volume, by reaching a high reaction temperature (preferably over 2,500° F. (1,371° C.)) and running the reaction nearly isothermally while utilizing the product stream to heat the fresh natural gas feed/fuel. The overall reaction decomposes methane into hydrogen and carbon solids:

$$CH_4 \rightarrow C + 2H_2$$

Hydrogen purity may be about 95% with about 5% methane remaining unconverted. The design is based on discrete heating followed by adiabatic cooling to about 50 Fahrenheit degrees approach to the equilibrium temperature at the corresponding zone-exit concentration of hydrogen.

The natural gas feed source enters at about 90° F. (32° C.) and is heated to a temperature of about 1000° F. (538° C.) in the presence of a small hydrogen recycle to preclude premature decomposition. The natural gas proceeds into the first heating zone of the ERT unit. Upon leaving the first zone the carbon/gas mixture has preferably increased to a temperature over 2,250° F. (1,232° C.). Each subsequent heating zone gradually heats the carbon/gas mixture in order to increase the reaction rate, and thus the rate at which carbon and hydrogen are produced. After passing through the third heating zone, the carbon/gas mixture exits the ERT unit at a controlled temperature of about 1,950° F. (1,065° C.).

The finalizing stage cools and separates the carbon/gas mixture that then passes through a steam generating heat exchange system to reduce the temperature to about 1,100° F. (593° C.) prior to entering the separation unit.

The ERT unit is comprised of three heating zones requiring a total heat input of about 17.3 MW for about 10 million standard cubic feet ("MM SCFD") of natural gas feed/fuel. The ERT system operates at a pressure of about 160 psig. Immediately following the ERT unit is a carbon removal unit that provides both a final reaction volume and a settling location for the carbon produced. The removal unit is refractory-lined and provides for continuous carbon removal.

Direct Carbon Fuel Cell

A fuel cell is an electrochemical device that converts chemical energy to electrical energy in a direct, efficient way without burning the fuel. An illustrative DCFC will be described in this section. DCFCs follow the same concept as the familiar hydrogen fuel cell but utilize solid carbon particles at high temperatures, typically about 1112° F. to about 1562° F. (600 to 850° C.) instead of gaseous fuel. The overall reaction converts carbon and oxygen (from air) into $CO_2$ and electricity:

$$C + O_2 \rightarrow CO_2 + \text{electricity}$$

This electrochemical reaction converts about 80% of the energy of combustion for carbon/oxygen into electricity without burning the carbon. DCFCs for stationary applications can provide up to about 1 kW per square meter of cell surface area, which is suitable for practical industrial applications. DCFCs could potentially have efficiencies ranging from about 85 to about 90% (compared to 35-60% for hydrogen fuel cells).

DCFC technology offers many advantages over standard hydrogen fuel cells. DCFCs typically do not use catalysts or expensive metals, leading to a reduced cost per square meter of cell area. Most importantly, DCFCs are much more efficient than conventional fuel cells and power plants.

An illustrative DCFC technology that utilizes hydroxide salts (either NaOH or KOH) as a molten electrolyte in two chambers separated by a porous plate (aluminum oxide or nickel) to oxidize the solid carbon fuel particles to form $CO_2$ in an electrochemical reaction with air bubbling through the electrolyte. The reactions that take place in the electrochemical cell are as follows:

Cathode $$O_2 + 2H_2O + 4e \rightarrow 4OH^-$$

Anode $$C + 6OH^- \rightarrow CO_3^{2-} + 3H_2O + 4e$$

$$C + 2CO_3^{2-} \rightarrow 3CO_2 + 4e$$

This DCFC process is able to convert carbon into electricity with approximately 80% efficiency.

Gas Turbine with Combined-Cycle

In an illustrative GTCC it utilizes the about 95% purity hydrogen stream from the ERT system as its fuel source. The fuel is combusted with compressed air by the following reactions:

$$2H_2 + O_2 \rightarrow 2H_2O$$

$$CH_4 + 2O_2 \rightarrow CO_2 + 2H_2O$$

The pressure at which the turbine operates is designed consistent with the discharge pressure of oxygen depleted air from the DCFC (about 130 psig). The oxygen-depleted air flows to the gas turbine combustor to reduce the turbine inlet temperature and to reduce the size of air compressor (reducing the air flow required for turbine inlet temperature control).

Air from the compressor controls Turbine Inlet Temperature ("TIT"). A typical industrial gas turbine has a TIT of approximately 2000° F. (1,093° C.). Several turbine manufacturers are now constructing turbines that can withstand TIT's up to about 2600° F. (1,427° C.). Two TITs have been considered: about 2000° F. (1093° C.) and about 2400° F. (1,315° C.).

The high temperature and high pressure combustion products expand through the turbine to generate power to drive the air compressor with the balance being used to generate electricity. The waste heat from the turbine exhaust is recovered as high pressure steam in a heat recovery steam generator ("HRSG".) The high pressure steam enters a steam turbine to generate additional power.

DCFC technology can be utilized to produce electricity in an integrated process involving an ERT unit, steam turbines and a gas turbine. A $CO_2$ product slipstream entrains the carbon after its separation from hydrogen and methane. Oxygen for the DCFC is supplied by compressed air, reacting with the carbon fuel in the manner described above. The reaction, taking place at approximately 1382° F. (750° C.), can produce high purity $CO_2$ as the main physical product with an oxygen-depleted air stream (consisting primarily of nitrogen) as a byproduct.

The term "ERT-POWER" will be used herein for DCFC technology and GTCC technology integrated with the ERT system.

The ERT-POWER system and process can be implemented as a new system or as retrofitted conventional GTCC technology. In an exemplary embodiment of the invention the ERT-POWER system produces more power than a conventional GTCC system, while inherently capturing $CO_2$.

Operation Analysis of an Illustrative Embodiment of the Invention

A conventional GTCC and the proposed ERT-POWER technology (two cases) were modeled using a 10 MMSCFD (million standard cubic feet per day) methane gas feed/fuel source. This allows a side by side comparative performance measures in terms of generating power while minimizing $CO_2$ emissions.

Efficiencies for all major rotating machinery such as compressors, turbines, and pumps from current operational equipment were determined. The calculations are based on the afore-mentioned 80% fuel cell efficiency.

Based on the heat and material balances generated through process modeling, the following operation data was determined:

TABLE 1

Performance Data

| Component | Combined-Cycle Gas Turbine TIT = 2000° F. Without $CO_2$ Capture | ERT-POWER TIT = 2000° F. With Inherent $CO_2$ Capture | ERT-POWER TIT = 2400° F. With Inherent $CO_2$ Capture |
|---|---|---|---|
| Gross Power Generation (MW) | 96.9 | 107.1 | 102.7 |
| Parasitic Power Consumed (MW) | 46.8 | 49.4 | 43.0 |
| NET POWER (MW) | 50.1 | 57.8 | 59.7 |
| $CO_2$ Emissions (short tons per year) | 197,160 | 17,960 | 17,960 |

TABLE 2

$CO_2$ Capture Efficiency

| $CO_2$ Efficiency Metric | Combined-Cycle Gas Turbine TIT = 2000° F. Without $CO_2$ Capture | ERT-POWER TIT = 2000° F. With Inherent $CO_2$ Capture | ERT-POWER TIT = 2400° F. With Inherent $CO_2$ Capture |
|---|---|---|---|
| lb of $CO_2$ released to atmosphere per 1.0 MW | 966 | 76.3 | 73.7 |
| lb of $CO_2$ released to atmosphere per 1.0 MMSCFD of methane fuel | 4,832 | 440 | 440 |
| % reduction in $CO_2$ for ERT-POWER vs Conventional GTCC per 1.0 MW | | 92.1% | 92.4% |
| % reduction in $CO_2$ for ERT-POWER vs Conventional GTCC per 1.0 MMSCFD of methane fuel | | 90.9% | 90.9% |

Using the same quality and quantity of fuel, the ERT-POWER process proves to produce 15% to 19% more electricity and be more efficient in capturing $CO_2$.

Integration of the ERT system with the DCFC includes various considerations such as, materials of construction and the pneumatic conveying of the carbon solid from the ERT system to the DCFC. In order to optimize such a process, the particle size of the carbon solid is needed to determine the required amount of entrainment fluid.

Figure 1:
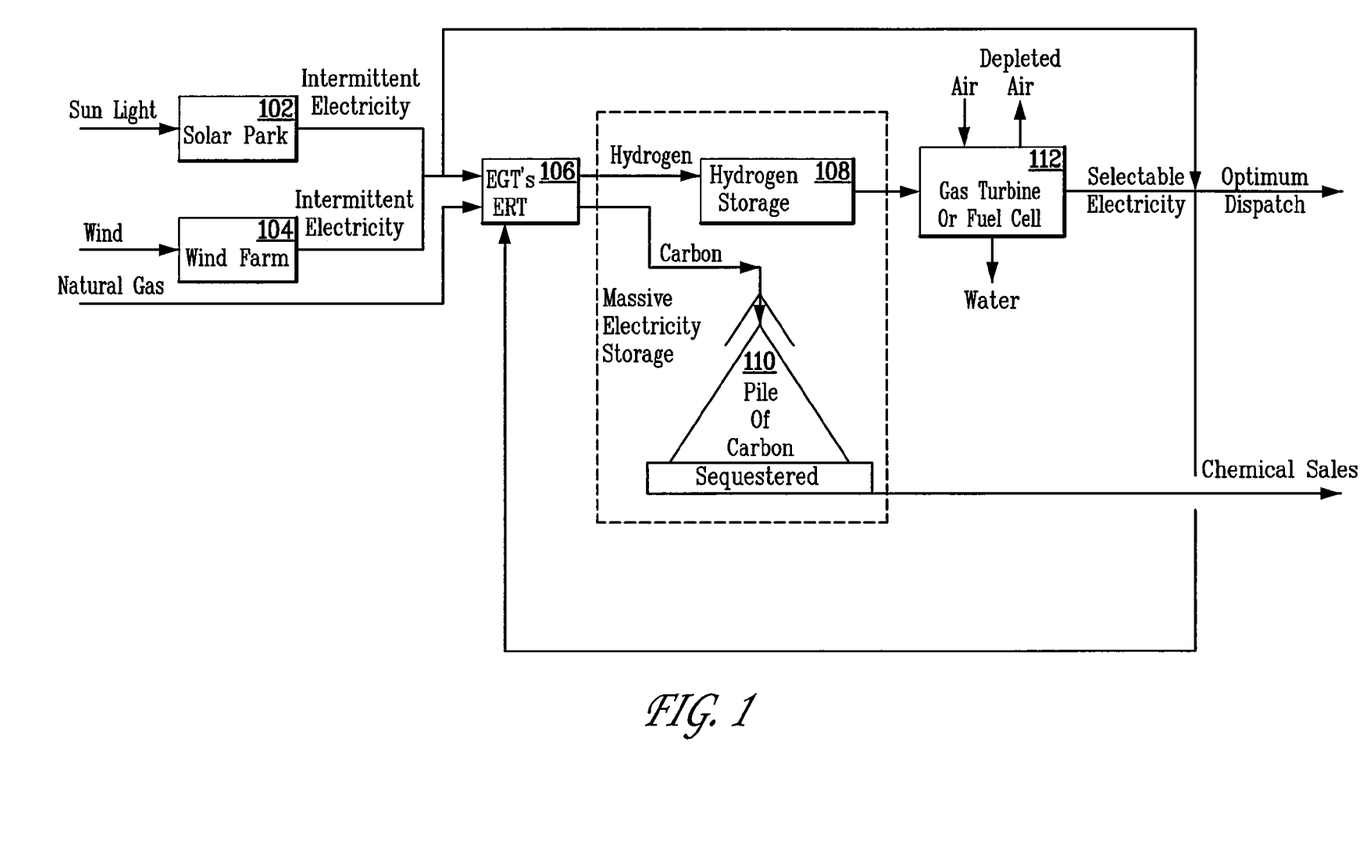
FIG. 1 depicts an ERT system integrated with a gas turbine or fuel cell and having hydrogen storage according to an illustrative embodiment of the invention.

FIG. 1 depicts an ERT system integrated with a gas turbine or fuel cell and having hydrogen storage according to an illustrative embodiment of the invention. Renewable intermittent electricity from a solar park 102 or wind farm 104 is used to provide electricity in an ERT unit 106. In addition to powering ERT unit 106, surplus electricity generated from any of the mechanisms can also be added to the electricity generated from the total system. Natural gas fuel can be varied to provide base load and capacity control. ERT unit 106 decomposes natural gas into hydrogen gas and carbon solids. The carbon may be collected and sequestered in component 110 or sold as a chemical product. The hydrogen is stored by conventional means in storage unit 108. The hydrogen fuels a gas turbine or fuel cell depicted at 112 to produce electricity. Because the hydrogen is stored, the gas turbine or fuel cell may operate at variable production rates to provide electricity to supplement the intermittent renewable solar and wind electricity. The system can be configured to allow for continuous and optimum dispatch of electricity so that the revenue from electricity sales may be maximized. Electricity is produced without carbon dioxide production, except that related to combustion of the residual methane in the hydrogen fuel. In an exemplary embodiment of the invention, greater than 95% of the carbon from the natural gas is sequestered.

Figure 2A:
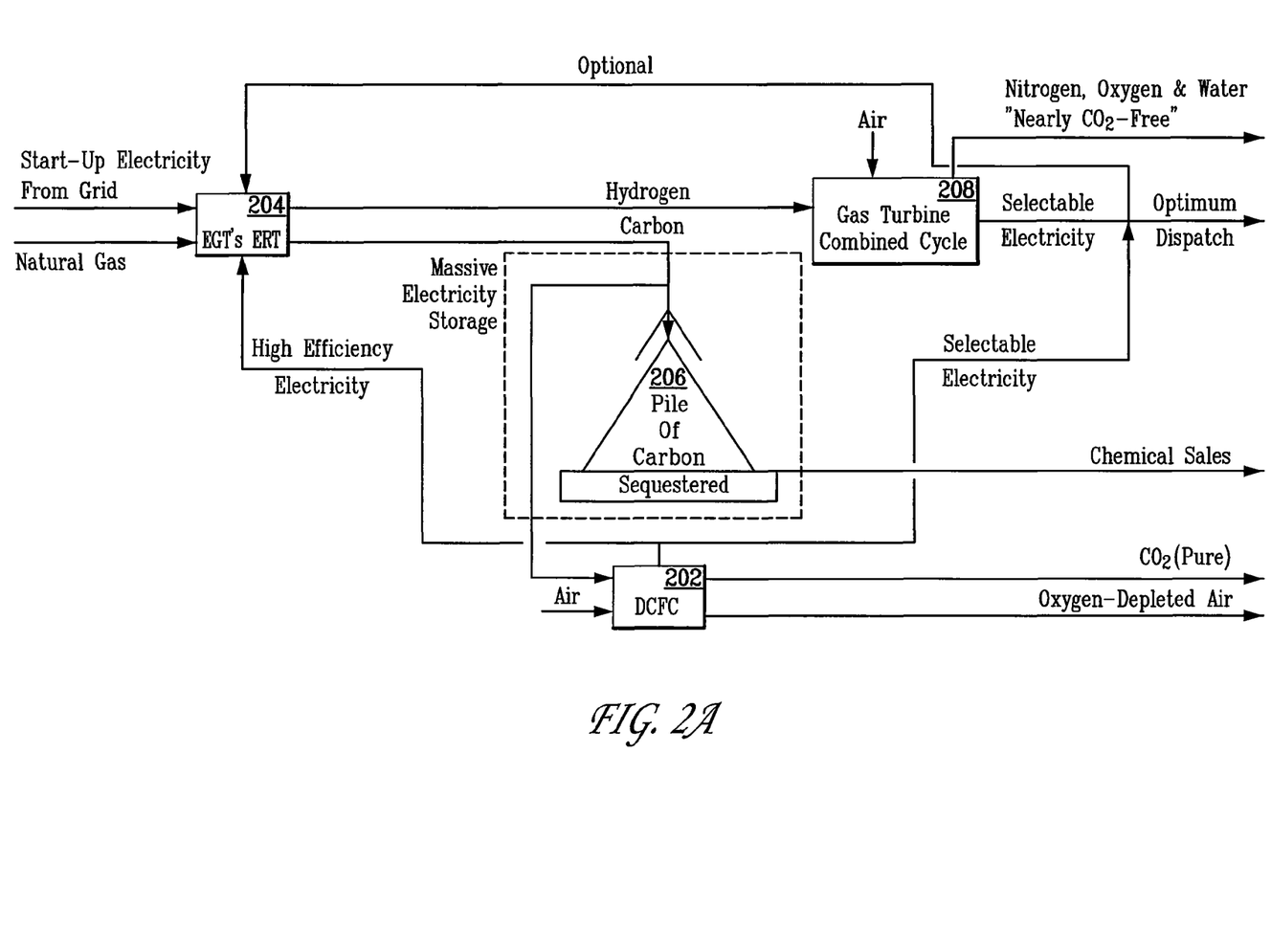
FIG. 2a depicts an ERT system integrated with a direct carbon fuel cell according to an illustrative embodiment of the invention.

FIG. 2a depicts an ERT system integrated with a direct carbon fuel cell according to a further illustrative embodiment of the invention. High-efficiency electricity from a direct carbon fuel cell 202 is used in the ERT unit to decompose natural gas into hydrogen gas and carbon solids. Start-up electricity from a grid is input to the ERT unit 204. A natural gas feed also enters ERT unit 204 where the natural gas is decomposed into hydrogen and carbon. A portion of the carbon is sequestered in unit 206, and a portion is input to direct carbon fuel cell 202, where electrochemical reactions oxidize the carbon into a substantially pure carbon dioxide product stream that is available for sequestration. DCFC 202 generates electricity, a portion of which is fed back to ERT unit 204 to power it, and a portion of which can be sold or utilized for other purposes. Preferably the latter portion is combined with the gas turbine power to provide an optimum dispatch in a high-efficiency poly-generation system. Power cycle efficiency may exceed about 70%. Oxygen-depleted air and carbon dioxide are also output from DCFC 202.

A gas turbine with combined cycle 208 burns hydrogen fuel to produce selectable electricity, i.e. variable at the operator's discretion respect to as will be described further below. The hydrogen and air are input to a combined cycle gas turbine 208 where it burns the hydrogen fuel to produce selectable electricity. Nitrogen, oxygen and water that is nearly free of carbon dioxide, are also output from the GTCC.

Figure 2B:
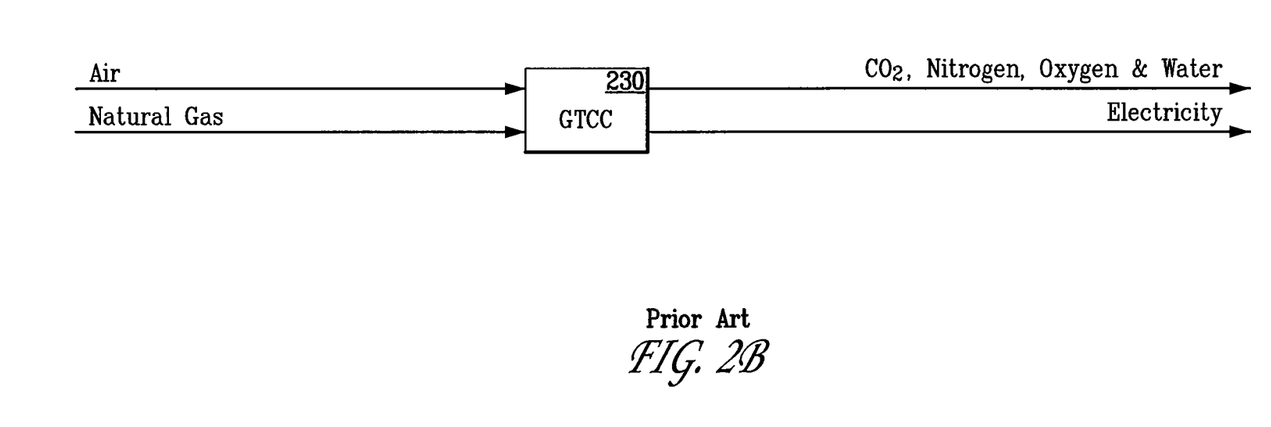
FIG. 2b depicts a prior art gas turbine system with combined cycle steam turbine without carbon capture.

FIG. 2b depicts a conventional prior art gas turbine system with combined cycle steam turbine. Natural gas is input to GTCC 230 where it is burned with compressed air and expanded across a turbine, thereby producing electricity. Vast emission of carbon dioxide in the vent stack gases are co-mingled with nitrogen, making carbon dioxide capture very capital and energy intensive. Power cycle efficiency is generally less than 60%.

Figure 3:
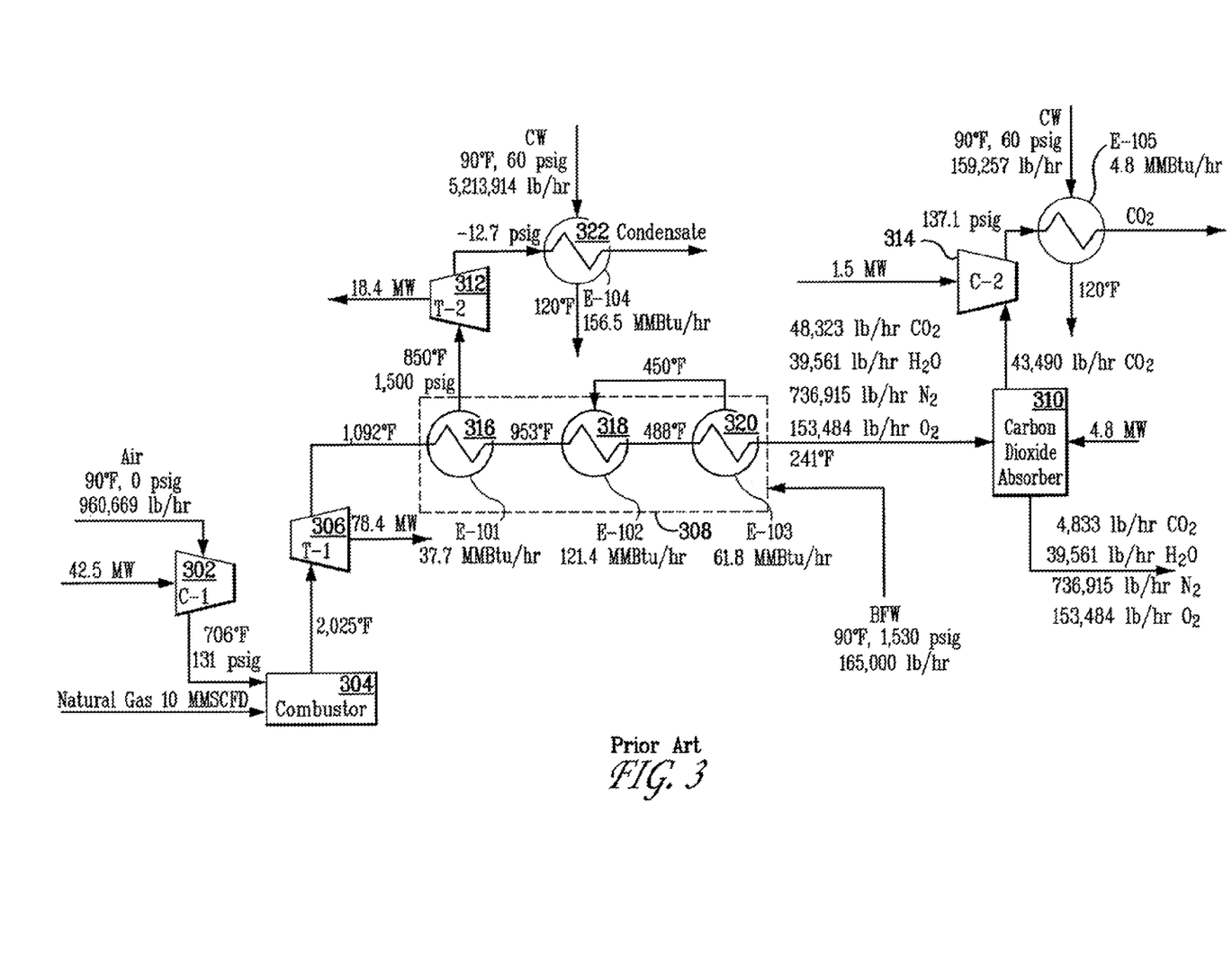
FIG. 3 depicts a prior art gas turbine with combined cycle steam turbine and with carbon capture.

FIG. 3 depicts a prior art gas turbine with combined cycle steam turbine and carbon capture. Table 3 provides a power summary for the system depicted in FIG. 3. (All quantities provided in the tables, figures and text herein are approximate and merely illustrative.) Conventional gas turbine system elements are included together with a carbon dioxide absorption and compression system for carbon capture. Air, at a temperature of 90° F. (32° C.) and 0 psig enters compressor C-1 (302) at 960,669 lb/hr where it is compressed and exits at a pressure of 131 psig and temperature of 706° F. (374° C.). The air is then mixed with natural gas and burned in combustor 304. The hot gases (2025° F.) (1107° C.) are expanded through turbine T-1 (306) to generate electricity. Exhaust gases from turbine 306 flow through a heat recovery steam generator (HRSG) 308. The exhaust gases enter a first heat exchanger 316 at a temperature of 1092° F. (589° C.), then enter heat exchanger 318 at a temperature of 953° F. (512° C.), and finally, enter a heater exchanger 320 at a temperature of 488° F. (253° C.). Feed water enters HRSG 308 and is preheated to about 90° F. (32° C.), vaporized and superheated. The feedwater exits HRSG at about 850° F. (454° C.) and 1,500 psig before being expanded in turbine T-2 (312) to generate a second increment of electricity. Exhaust steam from turbine 312 is cooled and condensed for recovery and recycled by passing through heat exchanger 322. Exhaust gases exit HRSG 308 at about 241° F. (116° C.) and include $CO_2$, $H_2O$, $N_2$, and $O_2$, at the following rates, 48,323 lb/hr. 39,561 lb/hr, 736,915 lb/hr, 153,484 lb/hr, respectively. The exhaust gases then enter a carbon dioxide absorber 310 and exit from the absorption solvent system at 4,833 lb/hr, 39,561 lb/hr, 736,915 lb/hr, and 153,484 lb/hr, for $CO_2$, $H_2O$, $N_2$, and $O_2$, respectively. $CO_2$ also exits carbon dioxide absorber 310 at 43,490 lb/hr and is directed into compressor C-2 (314). Carbon dioxide absorber 310 is typically a solvent-based system. Although other means may be employed, carbon dioxide is recovered at low pressure, essentially atmospheric pressure, and compressed in compressor (314) and is available for sequestration or chemical use. Table 3 shows that in an illustrative example, compressor 314 and carbon dioxide absorber 310 add more than 10% as a parasitic load to the system reducing overall system efficiency. Total export power is 45.2 MW from 10 million standard cubic feet per day of natural gas.

TABLE 3

POWER SUMMARY FOR STAT-OF-THE-ART GAS TURBINE WITH CARBON CAPTURE

|  | POWER (MW) |
|---|---|
| POWER GENERATORS | |
| Gas Turbine (T-1) | 78.4 |
| Steam Turbine (T-2) | 18.4 |
| POWER GENERATION TOTAL | 96.8 |
| POWER CONSUMERS | |
| Air Compressor for GT (C-1) | 42.5 |
| Compressor for $CO_2$ (C-2) | 1.5 |
| Cooling Water Pump | 0.37 |
| Carbon Dioxide Absorber | 4.8 |
| Auxiliaries | 2.4 |
| POWER CONSUMPTION TOTAL | 51.6 |
| TOTAL EXPORT POWER (MW) | 45.2 |

Figure 4:
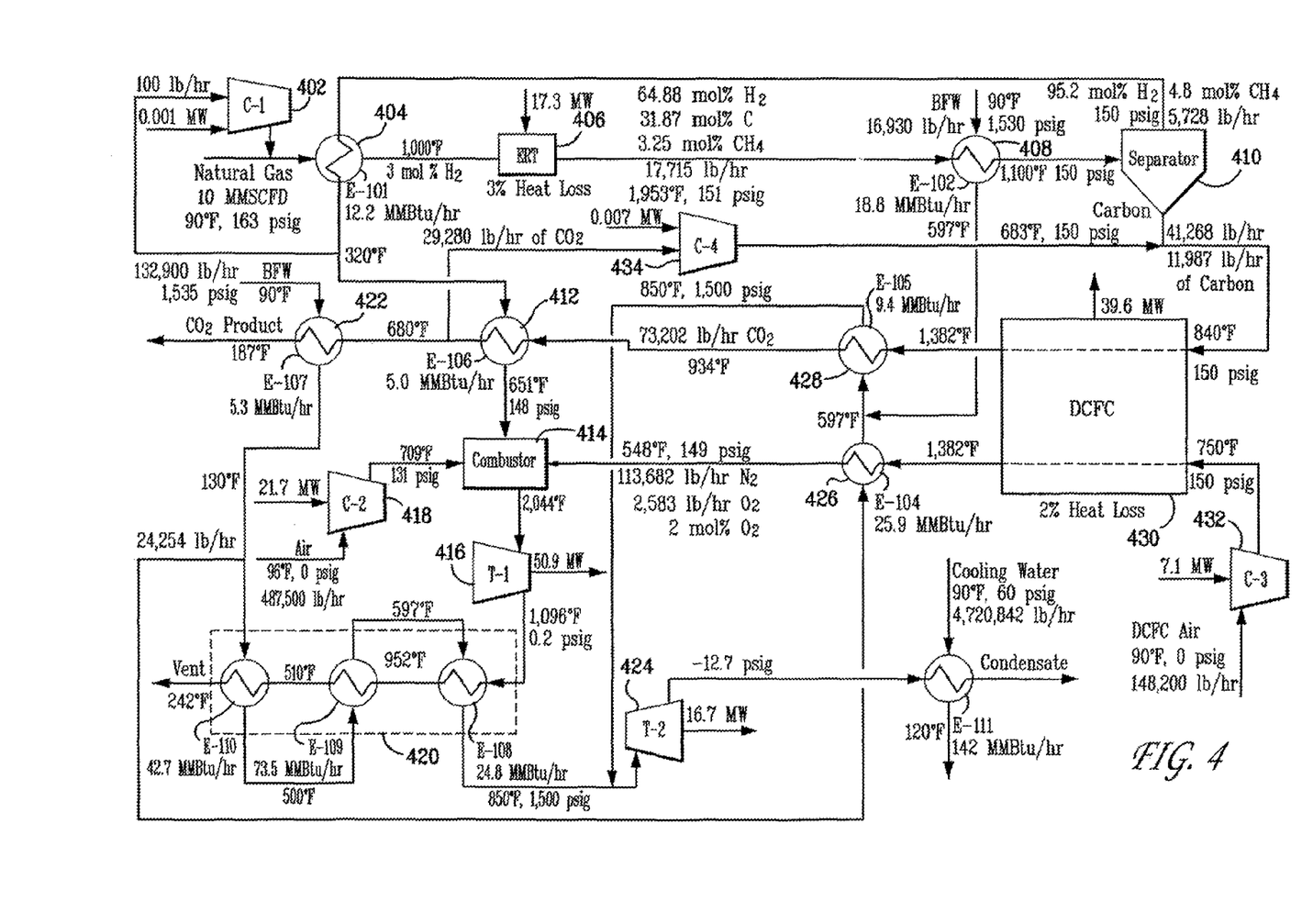
FIG. 4 depicts an ERT system and direct carbon fuel cell integrated with a gas turbine system according to a first illustrative embodiment of the invention.

FIG. 4 depicts an ERT system and direct carbon fuel cell integrated with a gas turbine system with a turbine inlet temperature of about 2000° F. (1093° C.), according to an illustrative embodiment of the invention. The process details provided in FIG. 4 are for the design that is conceptually presented in FIG. 2a. Natural gas, input at 90° F. (32° C.) and 163 psig, is mixed with a small flow of recycled hydrogen exiting compressor C-1 (402) to preclude long-term carbon formation during subsequent preheating. The hydrogen, about 3 mol %, and natural gas mixture is preheated in heat exchanger E-101 (404), and flows into ERT unit 406 at about 1000° F. (538° C.), where it is decomposed into hydrogen and carbon solids that then pass through heat exchanger E-102 (408). More specifically, the flow out of ERT unit 406 is at 17,715 lb/hr, 1,953° F. (1067° C.), and 151 psig, and includes 64.88 mol % $H_2$, 31.87 mol % C, and 3.25 mol % $CH_4$ Heat exchanger 408 preheats a first boiler feed water stream, entering at 16,930 lb.hr, 90° F. (32° C.), and 1,530 psig, before it flows to a separator 410 where hydrogen gas is separated from the carbon solids. The flow out of heat exchanger 408 into separator 410 is at 1100° F. (593° C.) and 150 psig. $H_2$, and $CH_4$ also flow from separator 410 at 5,728 lb.hr and 150 psig, and are in quantities of 95.2 mol %, and 4.8 mol %, respectively, into heat exchanger 404 The hydrogen gas is first cooled by preheating natural gas in heat exchanger 404 to a temperature of 320° F. (160° C.), and then reheated in heat exchanger E-106 (412) prior to entering the combustor 414 of the gas turbine system. Hydrogen enters combustor 414 at 651° F. (344° C.) and 148 psig. This reheating facilitates control of the combustor outlet temperature, (which is also the inlet temperature of turbine T-1 (416)) to approximately 2000° F. (1093° C.) (designated as 2044° F. (1118° C.) in the diagram). Air to combustor 414 is supplied by compressor C-2 (418) at 709° F. (376° C.) and 131 psig. The exhaust flow from turbine 416, at 1096° F. (591° C.) and 0.2 psig, passes through HRSG 420 and is vented at approximately 250° F. (121° C.) designated as 242° F. (117° C.) in the diagram. Heat exchangers within HRSG 420 cool the flow first to 925° F. (496° C.), then to 510° F. (265° C.), before exiting at 242° F. (117° C.). A second boiler feed water stream, initially at 132,900 lb.hr, 90° F. (32° C.) and 1535 psig, is preheated in exchanger E-107 (422) and splits with one portion entering HRSG 420 at 130° F. (54° C.) where it is further preheated, vaporized and superheated and then enters turbine T-2 (424) at 850° F. (454° C.) and 1500 psig; and another portion flowing to heat exchanger E-104 and E105 (426, 428) where it is vaporized and superheated, also on its way to turbine 424. Exhaust flow from turbine 424 is condensed and recycled to a-boiler feed water treatment system (not shown).

Air to a direct carbon fuel cell 430, initially at 90° F. (32° C.), 0 psig and 148,200 lb/hr, is compressed in C-3 (432), entering DCFC 430 at about 750° F. (399° C.) and 150 psig. Carbon solids from separator 410 also flow to the direct carbon fuel cell, entering at 840° F. (449° C.) and 150 psig. Electrochemical oxidation of the carbon is exothermic with the depleted air leaving direct carbon fuel cell 430 at approximately 1382° F. (750° C.) and carbon dioxide leaving at approximately the same temperature. The hot depleted air is cooled in heat exchanger 426 as it preheats and vaporizes the second portion of the second boiler feed water flow on its way to combustor 414. The flow into combustor 414 is at 548° F. (287° C.), and 149 psig, and contains flows of $N_2$, and $O_2$, at 113,682 lb/hr and 2,583 lb/hr, respectively, the mixture having 2 mol % $O_2$. The hot carbon dioxide stream (1382° F. or 750° C.) superheats the steam from heat exchanger 428 before being further cooled in heat exchangers 412 (to 680° F. or 360° C.) and 422 (to 187° F. or 86° C.) and exited as substantially pure carbon dioxide at the battery limits as pure $CO_2$ product. A slipstream of the carbon dioxide is extracted between heat exchangers 412 and 422, which flows at 29,280 lb/hr into compressor C-4 (434) and used as a carbon carrier gas to assure smooth flow of the carbon solids into direct carbon fuel cell 430. Before mixing with the carbon from separator 410, the carbon dioxide from compressor 434 is at 683° F. (362° C.) and 150 psig.

Table 4 shows, for this illustrative embodiment, total export power for this configuration is 57.8 MW from the same 10 million standard cubic feet per day of natural gas.

TABLE 4

POWER SUMMARY FOR ERT-POWER - 150 PSIG & 2000° F. CASE

|  | POWER (MW) |
|---|---|
| POWER GENERATORS | |
| Gas Turbine (T-1) | 50.9 |
| Steam Turbine (T-2) | 16.7 |
| DCFC | 39.6 |
| POWER GENERATION TOTAL | 107.2 |
| POWER CONSUMERS | |
| $CH_4/H_2$ Gas Compressor (C-1) | 0.001 |
| Air Compressor for GT (C-2) | 21.7 |
| Air Compressor for DCFC (C-3) | 7.1 |
| $CO_2$ Compressor (C-4) | 0.007 |
| "ERT" Electric Reactor | 17.3 |
| Cooling Water Pump | 0.33 |
| Auxiliaries | 3.0 |
| POWER CONSUMPTION TOTAL | 49.4 |
| TOTAL EXPORT POWER (MW) | 57.8 |

Figure 5:
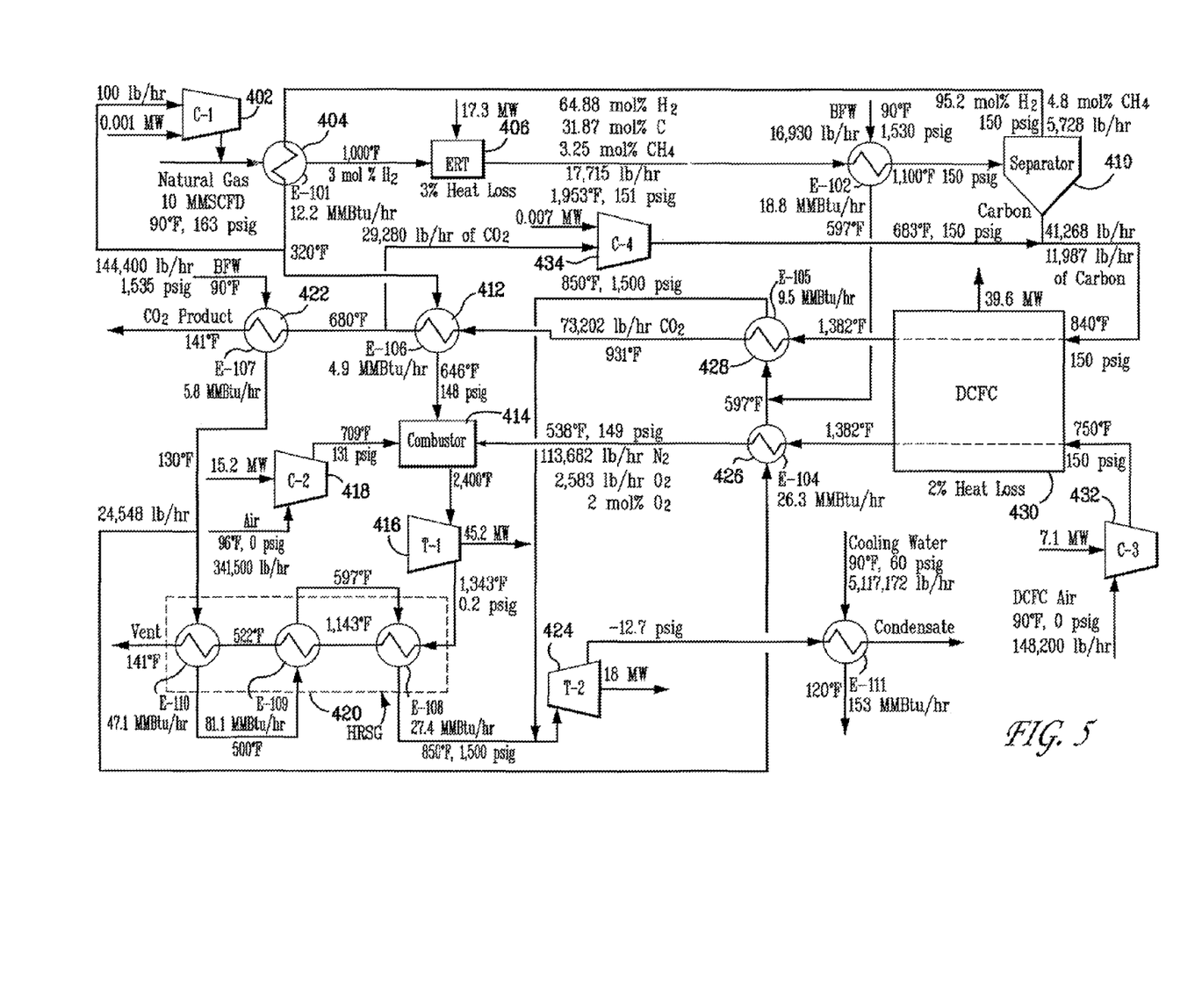
FIG. 5 depicts ERT system and direct carbon fuel cell integrated with a gas turbine system according to a second illustrative embodiment of the invention.

FIG. 5 depicts ERT system and direct carbon fuel cell integrated with a gas turbine system with a turbine inlet temperature of about 2400° F. (1316° C.) according to an illustrative embodiment of the invention. Table 5 provides a power summary for the system depicted in FIG. 5. The same process configuration is presented as in FIG. 4, however, the airflow to compressor C-2 (418) has been reduced to 341,500 lb/hr resulting in increased combustor temperature, now 2400° F. (1316° C.) into turbine T-1 (416). This increases total export power to 59.8 MW from the same 10 million standard cubic feet per day of natural gas, creating a more efficient system, as shown in Table 5. As one skilled in the art will understand additional variations to the process parameters can be made within the scope of the invention.

TABLE 5

POWER SUMMARY FOR ERT-POWER - 150 PSIG & 2400° F. CASE

|  | POWER (MW) |
|---|---|
| POWER GENERATORS | |
| Gas Turbine (T-1) | 45.2 |
| Steam Turbine (T-2) | 18.0 |
| DCFC | 39.6 |
| POWER GENERATION TOTAL | 102.8 |
| POWER CONSUMERS | |
| $CH_4/H_2$ Gas Compressor (C-1) | 0.001 |
| Air Compressor for GT (C-2) | 15.2 |
| Air Compressor for DCFC (C-3) | 7.1 |
| $CO_2$ Compressor (C-4) | 0.007 |

TABLE 5-continued

POWER SUMMARY FOR ERT-POWER - 150 PSIG & 2400° F. CASE

|  | POWER (MW) |
|---|---|
| "ERT" Electric Reactor | 17.3 |
| Cooling Water Pump | 0.36 |
| Auxiliaries | 3.0 |
| POWER CONSUMPTION TOTAL | 43.0 |
| TOTAL EXPORT POWER (MW) | 59.8 |

The invention will now be generally described. A power generation system is provided comprising a carbon production apparatus and a fuel cell to generate electricity. The carbon production apparatus is functionally connected to the fuel cell to provide carbon to the fuel cell to generate electricity. The system is configured to power the carbon production apparatus with a portion of the electricity generated from the fuel cell. In an exemplary embodiment of the invention the fuel cell is a direct carbon fuel cell. The carbon production apparatus is preferably an ERT system having electric resistance heaters to decompose hydrocarbon gas to hydrogen gas and carbon solids. The system may also have a gas turbine system wherein the power generation system is configured so the hydrogen gas from the carbon production apparatus is input as fuel to a combustor in the gas turbine system.

The ERT system may be for example, a gas phase, single pass, plug flow, chemical reactor, with multiple electric-resistance heaters inside its reaction chamber. An exemplary ERT system comprises one or more heating zones, wherein each heating zone comprises one or more heating stations and each heating station comprises one or more heating screens followed by a final near-equilibrium attainment zone without additional heat input; an inlet into a first of the one or more heating zones for input of a gas from which carbon will be formed; a finishing station for cooling and removal of carbon solids; an outlet for the output of hydrogen; and an outlet for output of the carbon.

Other examples of carbon production systems that can replace the ERT system 406 in the configuration shown in FIGS. 4 and 5 include plasma systems, delayed coker and coke calciner.

In an illustrative embodiment of the invention, the power generation system may include a gas turbine system herein the power generation system is configured so oxygen-depleted air released from the fuel cell enters the gas turbine system's combustor and serves as a diluant/coolant, thereby reducing the load on the gas turbine system's compressor.

The power generation system may comprise a carbon dioxide source wherein the power generation system is configured so the carbon produced by the carbon production apparatus is carried by carbon dioxide from the carbon source to the fuel cell.

The carbon production system generally will also produce hydrogen since the system will typically produce the carbon from a hydrocarbon such as methane. Therefore, the power generation system comprises a gas turbine system, wherein the power generation system is configured so the hydrogen produced is fed into the gas turbine system to produce additional electricity. The turbine system may be for example, a combined cycle gas turbine system or a simple cycle gas turbine system.

The power generation system may also be configured so heat released from the fuel cell is used as a supplemental source of steam for a turbine.

The gas turbine may have one or more compressors. In an illustrative embodiment of the invention, a first compressor may provide air to the fuel cell and a second compressor may provide air to the combustor. In an alternative embodiment of the invention, one compressor provides air to the fuel cell and to the combustor.

In an exemplary embodiment of the invention, the fuel cell is configured to run at greater than atmospheric pressure. The optimum fuel cell pressure will depend, at least in part, on the combustion pressure going into turbine T-1. In an illustrative example, the combustion pressure into the turbine is 130 psig and the fuel cell runs at 150 psig. Higher efficiency turbines operate at higher combustion pressures. An illustrative fuel cell pressure range is about 150 psig to about 450 psig. Carbon and or hydrogen may be sequestered and used to generate power on a variable basis. Preferably the variable generation and/or release of power will be computer controlled. One or more machine readable storage media containing an executable code are configured to utilize the sequestered carbon and/or hydrogen to generate power on a variable basis. The variable basis may be dependent on parameters such as electricity rates and/or fuel prices. The process or software can be configured to maximize profits generated by sale of the electricity. In general, the control system can do one or more of the following, in addition to other possible control tasks:

vary the amount of carbon utilized by the fuel cell based on electricity rates.

vary the amount of carbon produced based on fuel prices.

vary the amount of carbon produced and sequestered depending on fuel prices.

vary the amount of hydrogen utilized by the fuel cell based on electricity rates.

vary the amount of hydrogen produced based on fuel prices.

vary the amount of hydrogen produced and sequestered depending on fuel prices.

The power generation system may include a compressor configured to compress air and recover at least some of the heat generated by compressing the air, and use some or all of the heat in the fuel cell to increase electricity production.

The power generation system may have a gas turbine system having a gas turbine and an air compressor that are independently controllable.

The invention includes a method of producing power comprising providing a power generation system according to any of the embodiments described herein, wherein the system includes a carbon fuel cell. The method includes providing carbon to the fuel cell to generate electricity and optionally utilizing at least a portion of the generated electricity to produce the carbon.

The invention also includes a method of reconfiguring a gas turbine power generation system to capture carbon comprising: providing a carbon production apparatus, providing a direct carbon fuel cell; configuring the gas turbine system, carbon production apparatus and fuel cell such that: carbon from the carbon production apparatus is used by the fuel cell to generate electricity and a portion of the generated electricity is used to power the carbon production apparatus. The invention further includes reconfiguring a gas turbine power generation system to any of the power generation systems described herein.

The carbon input to the fuel cell may be for example, charcoal, coal, activated carbon, petroleum coke, calcined coke, plasma-produced carbon, and ERT-produced carbon.

The power generation system can be configured to provide carbon dioxide as a carrier for the carbon transported to the fuel cell. The system can also be configured to direct a portion of the air from a compressor present in the non-reconfigured gas turbine power generation system to the fuel cell.

The power generation system can be configured so the carbon production apparatus is powered at least in part with electricity generated from a renewable and intermittent energy source, such as solar and/or wind.

Various embodiments of the invention have been described, each having a different combination of elements. The invention is not limited to the specific embodiments disclosed, and may include different combinations of the elements disclosed and their equivalents. It is also noted that wherein a system is described as "configured" this can also include "reconfigured" and vice versa.

While the invention has been described by illustrative embodiments, additional advantages and modifications will occur to those skilled in the art. Therefore, the invention in its broader aspects is not limited to specific details shown and described herein. Modifications, for example, to the carbon production apparatus, gas turbine system, and the integration of those components with a fuel cell, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A power generation system comprising:
   a carbon production apparatus in the form of an Electric Reaction Technology system having electric resistance heaters to decompose a hydrocarbon gas to hydrogen gas and carbon solids in an oxygen-free and oxidant-free environment, and without net production of carbon monoxide and carbon dioxide;
   a separator separating a combined flow of the hydrogen gas and carbon solids from the Electric Reaction Technology system into a hydrogen qas stream and a carbon solids stream;
   a direct carbon fuel cell to generate electricity and a carbon dioxide gas stream;
   the separator functionally connected to the direct carbon fuel cell to provide the carbon solids stream to the direct carbon fuel cell to generate electricity;
   wherein the power generation system is configured to power the Electric Reaction Technology system with a portion of the electricity generated from the direct carbon fuel cell;
   a gas turbine system having a combustor; and
   a heat exchanger fluidly connected to the separator, the direct carbon fuel cell, and the combustor to heat the hydrogen gas stream using the carbon dioxide gas stream, wherein the power generation system is configured so the heated hydrogen gas stream from the heat exchanger is input as fuel to the combustor.

2. The power generation system of claim 1 configured to combine the generated electricity with intermittent electricity from one or more additional sources to produce optimum dispatch.

3. The power generation system of claim 1 wherein the Electric Reaction Technology system comprises:
   one or more heating zones, wherein each heating zone comprises one or more heating stations and each heating station comprises one or more heating screens followed by a final near-equilibrium attainment zone without additional heat input;

an inlet into a first of the one or more heating zones for input of the hydrocarbon gas from which the carbon solids will be formed;
a finishing station for cooling and removal of the carbon solids;
an outlet for the output of the hydrogen gas; and
an outlet for the output of the carbon solids.

4. The power generation system of claim 1 further comprising:
the gas turbine system having a compressor;
wherein the power generation system is configured so oxygen-depleted air released from the direct carbon fuel cell enters the combustor and serves as a diluent/coolant, thereby reducing the load on the compressor.

5. The power generation system of claim 1 further comprising a carbon dioxide source wherein the power generation system is configured so the carbon solids stream produced by the carbon production apparatus is carried by carbon dioxide from the carbon dioxide source to the direct carbon fuel cell.

6. The power generation system of claim 1 further comprising a combined cycle gas turbine system.

7. The power generation system of claim 1 further comprising a simple cycle gas turbine system.

8. The power generation system of claim 1 further comprising:
the gas turbine system having a steam turbine;
wherein the power generation system is configured so heat released from the direct carbon fuel cell is used as a supplemental source of steam for the steam turbine.

9. The power generation system of claim 1 further comprising:
the gas turbine system having a first compressor and a second compressor, wherein the first compressor provides air to the direct carbon fuel cell and the second compressor provides air to the combustor.

10. The power generation system of claim 1 further comprising:
the gas turbine system having a compressor,
wherein the compressor provides air to the direct carbon fuel cell and to the combustor.

11. The power generation system of claim 1 wherein the direct carbon fuel cell is configured to run at greater than atmospheric pressure.

12. The power generation system of claim 11 wherein the direct carbon fuel cell is configured to run in a pressure range of about 150 psig to about 450 psig.

13. The power generation system of claim 1 further comprising:
a carbon solids storage component, a hydrogen gas storage component or both; and
one or more machine readable storage media containing an executable code configured to utilize the stored carbon solids and/or hydrogen gas to generate power on a variable basis.

14. The power generation system of claim 13 wherein the variable basis is dependent on one or both of electricity rates and fuel prices.

15. The power generation system of claim 1 having a compressor configured to:
compress air;
recover at least some of the heat generated by compressing the air; and
utilize at least some of the recovered heat in the direct carbon fuel cell to increase electricity production.

16. The power generation system of claim 1 further comprising:
the gas turbine system having a gas turbine and an air compressor that are independently controllable.

17. A method of reconfiguring a gas turbine power generation system to capture carbon comprising:
providing a carbon production apparatus in the form of an Electric Reaction Technology system having electric resistance heaters to decompose hydrocarbon gas to hydrogen gas and carbon solids in an oxygen-free and oxidant-free environment, and without net production of carbon monoxide and carbon dioxide;
separating a combined flow of the hydrogen gas and carbon solids from the Electric Reaction Technology system into a hydrogen gas stream and a carbon solids stream in a separator;
providing a direct carbon fuel cell;
configuring the gas turbine power generation system, carbon production apparatus and direct carbon fuel cell such that carbon from the carbon solids stream is used by the direct carbon fuel cell to generate electricity and a carbon dioxide qas stream;
using a portion of the generated electricity to power the Electric Reaction Technology system;
heating a portion of the hydrogen gas stream in a heat exchanger using the carbon dioxide gas stream as a heat source; and
fueling the gas turbine power generation system with the heated portion of the hydrogen gas stream.

18. The method of claim 17 further comprising configuring the gas turbine power generation system to store the carbon solids stream and/or the hydrogen gas stream and utilize the carbon solids stream and/or the hydrogen gas stream to generate power on a variable basis dependent on one or both of electricity rates and fuel prices.

19. The method of claim 17 further comprising:
combining the direct carbon fuel cell generated electricity with intermittent electricity from one or more additional sources to produce optimum dispatch.

20. The method of claim 17 further comprising:
reconfiguring the gas turbine power generation system so the hydrogen gas from the carbon production apparatus is input as a fuel to a combustor of the gas turbine system.

21. The method of claim 17 wherein the gas turbine power generation system has a compressor and combustor and the method comprises:
directing oxygen-depleted air released from the direct carbon fuel cell into the combustor as a diluent/coolant, thereby reducing the load on the compressor.

22. The method of claim comprising:
providing a carbon dioxide source;
carrying, by carbon dioxide, the carbon produced by the carbon production apparatus from the separator to the direct carbon fuel cell.

23. The method of claim 17 wherein the gas turbine power generation system has a steam turbine and the method comprises;
using heat released from the direct carbon fuel cell as a supplemental source of steam for the steam turbine.

24. The method of claim 17 wherein the gas turbine power generation system has a combustor, a first compressor and a second compressor, and the method comprises:
providing air to the direct carbon fuel cell from the first compressor; and
providing air to the combustor from the second compressor.

25. The method of claim 17 wherein the gas turbine power generation system has a gas turbine and an air compressor, and the method comprises:
   independently controlling the gas turbine and the air compressor.

26. A method of reconfiguring a gas turbine power generation system to capture carbon comprising:
   providing a carbon production apparatus in the form of a plasma system to decompose hydrocarbons to hydrogen gas and carbon solids in an oxygen-free and oxidant-free environment, and without net production of carbon monoxide and carbon dioxide;
   separating a combined flow of the hydrogen gas and carbon solids from the plasma system into a hydrogen gas stream and a carbon solids stream;
   providing a direct carbon fuel cell;
   configuring the gas turbine power generation system, carbon production apparatus and direct carbon fuel cell such that carbon from the carbon solids stream is used by the direct carbon fuel cell to generate electricity and a carbon dioxide gas stream;
   using a portion of the generated electricity to power the plasma system;
   heating a portion of the hydrogen gas stream in a heat exchanger using the carbon dioxide gas stream as a heat source; and
   fueling the gas turbine power generation system using the heated portion of the hydrogen gas stream.

27. A power generation system comprising:
   a carbon production apparatus in the form of an plasma system to decompose hydrocarbon gas to hydrogen gas and carbon solids in an oxygen-free and oxidant-free environment, and without net production of carbon monoxide and carbon dioxide;
   a separator separating a combined flow of the hydrogen gas and carbon solids from the plasma system into a hydrogen gas stream and a carbon solids stream;
   a direct carbon fuel cell to generate electricity and a carbon dioxide gas stream;
   the separator functionally connected to the direct carbon fuel cell to provide the carbon solids stream to the direct carbon fuel cell to generate electricity;
   wherein the power generation system is configured to power the plasma system with a portion of the electricity generated from the direct carbon fuel cell;
   a gas turbine system having a combustor; and
   a heat exchanger fluidly connected to the separator, the direct carbon fuel cell, and the combustor to heat the hydrogen gas stream using the carbon dioxide gas stream, wherein the power generation system is configured so the heated hydrogen gas stream from the heat exchanger is input as fuel to the combustor.

* * * * *